Nov. 1, 1960

D. T. McRUER ET AL 2,958,483

LONGITUDINAL STABILITY AUGMENTER

Filed Aug. 3, 1953

INVENTORS:
Duane T. McRuer
Richard J. Kulda,
Alvin R. Vogel

By Herbert E. Metcalf
Their Patent Attorney

Nov. 1, 1960    D. T. McRUER ET AL    2,958,483
LONGITUDINAL STABILITY AUGMENTER
Filed Aug. 3, 1953    2 Sheets-Sheet 2

INVENTORS:
Duane T. McRuer
Richard J. Kulda
Alvin R. Vogel
By Herbert E. Metcalf
Their Patent Attorneys

United States Patent Office 2,958,483
Patented Nov. 1, 1960

2,958,483

LONGITUDINAL STABILITY AUGMENTER

Duane T. McRuer, Los Angeles, Richard J. Kulda, Redondo Beach, and Alvin R. Vogel, Los Angeles, Calif., assignors to Northrop Corporation, Hawthorne, Calif., a corporation of California Filed Aug. 3, 1953, Ser. No. 371,758

3 Claims. (Cl. 244—77)

The present invention is generally related to flight control systems for aircraft and to automatic damping means used in conjunction therewith for reducing undesirable oscillations of the craft about a selected flight path, and more particularly to a means and method for increasing the longitudinal stability of high speed fighter type aircraft under both manual as well as automatic modes of operation and under the varied conditions of steady and disturbed flight normally encountered while cruising as well as during tactical maneuvers, landing approaches, etc.

The subject matter of this invention is intimately related to that of the assignee's co-pending application Serial No. 342,256, of Feeney et al., entitled "Sideslip Stability Augmenter" and filed March 13, 1953, now Pat. No. 2,833,495, inasmuch as the basic principle of stability augmentation which therein applies to the case of lateral stability is also underlying the development of the present case of longitudinal stability augmentation, and inasmuch as both developments have been designed for preferably simultaneous utilization in the same type of aircraft such as in the jet propelled all weather type combat craft currently produced by the assignee under the designation of F-89.

High performance airplanes of the type herein considered have relatively poor handling qualities at certain flight conditions. The exterior configurations of these airplanes are determined primarily on the basis of performance and secondarily on the basis of control and stability. This design procedure sometimes results in configurations with such poor stability characteristics that the pilot has difficulty in maintaining adequate control.

Stability and control qualities inherent in a basic airframe design are essentially incompatible functions.

Stability is that quality which opposes a change in flight path, and control is that quality which enables the pilot to change the flight path in accordance with his command. A change in the exterior configuration of an airframe to achieve stability is referred to as "outboard stabilization." An example of outboard stabilization is an increase in the size of the horizontal stabilizer. This change increases the static and dynamic stability but decreases the degree of control. In addition, the increased surface area increases the drag of the airplane and thus reduces the performance capabilities.

Because of the conflicting effects of increasing stability with outboard stabilization, a concept referred to as "inboard stabilization" or stability augmentation has achieved prominence. Stability augmentation is a method of increasing the stability of an airplane by causing a control surface (or several control surfaces) to be automatically deflected in proportion to a measurable quantity (such as normal acceleration, roll rate, side-slip angle, aileron deflection angle, etc.) which is in some measure related to disturbances from a stable flight condition and which is known either to contribute in the restoration of stability or to adversely affect such restoration. In the case of lateral stability, for instance, a sideforce due to sideslip introduces a yawing moment which aids in reducing sideslip (stability derivative). If this sideforce due to sideslip is measured, and if the rudder is deflected in proportion to and in the correct sense of this measured quantity, a yawing moment due to rudder deflection is added to the original directional stability derivative (i.e. to the yawing moment due to sideslip) which acts to augment the stability restoring forces. Thus, it is seen that the total effective value of the restoring yawing moment (= equivalent stability derivative) is the sum of that value inherent in the airframe due to its configuration plus the incremental value due to augmentation. Consequently, it can be said that stability augmentation increases the stability of an airplane without necessitating a change in the exterior configuration thereof. In addition, "inboard" stabilization enhances the stability of an airframe without compromising either the performance or control. (Indeed, if the basic airframe configuration were designed in the light of stability augmentation, it would require less inherent stability. This implies superior performance and yet precise control!) In modern fighter type aircraft which are equipped with fire control systems, this need for increased stability and precise control is particularly pronounced since the craft must be capable of being automatically stabilized to an established gun or rocket line and yet accept quick manual commands calling for flight path changes.

In further elaboration on the above cited stability augmentation principles, it is possible to select various feedback quantities so as to very nearly regulate all the natural frequencies, dampings, and time constants of both, the longitudinal and lateral modes of the airframe to any desired values. That is, stability augmentation effectively serves to alter the airframe transfer functions to predetermined desirable forms. By programming the gains as a function of, say, Mach number and altitude, it is also possible to make these transfer functions appear essentially invariant with flight conditions.

No firm selection of the feedback quantities to be used in an augmented airframe can be made without careful examination of the dynamics of the particular airframe as well as of the control system selected for use in conjunction therewith. Design criteria of the control system are determined after the dynamics of the latter have been altered to conform to the desirable dynamics of the resultant airframe-plus control system combination, that is, after the overall system performance requirements have been established. In order to maintain optimum overall system performance which is independent of changes in Mach number and altitude, this airframe-plus control system must be regulated to remain essentially invariant with changing flight conditions, the human pilot being considered an essentially invariant component "block" of the overall system.

Extensive analytical methods have been employed to determine the feedback quantities which are appropriate for the class of airplanes herein considered. Stated in general terms, and applied to the specific case of longitudinal stability augmentation herein specified, the insight gained into the problems at hand has indicated that the basic airframe output quantities best suited to meet the indicated objectives (and to satisfy a number of additional requirements which lie beyond the scope of this specification) are normal acceleration and its derivative as well as forward speed and its derivative. These quantities, if properly measured aboard the craft and utilized as elevator feedback control voltages, offer an effective means for increasing the longitudinal stability of the craft under a wide range of flight conditions.

In accordance with the principles summarily outlined above, it is a general objective of the present invention to improve the static and dynamic longitudinal stability of a high speed fighter type aircraft by so-called "inboard" stabilization or stability augmentation methods.

It is a further general objective of the present invention to enhance the handling qualities of modern high speed fighter type aircraft through longitudinal stability augmentation in a manner whose effectiveness remains essentially invariant with changes in Mach number and altitude.

An additional object of this invention is to establish a system of simultaneous manual and automatic elevator control wherein the pilot's freedom to command the elevator remains unimpaired while the automatic control means operate to increase the longitudinal stability of the craft.

A more specific object of the present invention is to augment the longitudinal stability of high speed fighter type aircraft equipped with fully powered longitudinal surface controls by automatically deflecting the elevator in response to feedback signals which are proportional to forward speed, normal acceleration and their derivatives.

In a preferred form of instrumentation of this invention, a normal accelerometer and a Machmeter are used as sensors for the measurement of normal acceleration and forward speed, respectively, which together with their time derivatives constitute the basic airframe output quantities that have been found suitable for conversion into corresponding elevator feedback voltages for the purpose of inboard stabilization (=stability augmentation) in the longitudinal motion of the craft. Expressed in other words: The longitudinal stability augmentation system of the present invention comprises a positional servo mechanism that produces an elevator deflection proportional to an electrical signal without causing any motion of the pilot's control stick, the electrical signal being a combined function of the normal acceleration and forward speed of the craft. The normal accelerometer is located at a point forward of the center of gravity (=C.G.) of the craft which constitutes the effective center of rotation for forces acting against the elevator control surface of the craft. The normal sensor therefore does not respond to normal acceleration forces which are due to elevator deflections but registers all normal acceleration forces resulting in particular from short period longitudinal oscillations of the craft, from vertical gusts, etc. A normal acceleration signal from this sensor as well as a rate of change of normal acceleration signal, if converted into corresponding elevator deflection voltages, introduce pitching moments through elevator deflections which counteract quite effectively the short period longitudinal oscillatory motions of the craft that cause these normal accelerometer signals. They tend to fly the craft at unity load factor, minimize the effects of vertical gusts and provide various additional desirable results. Signals from the Machmeter (determined by the position of a potentiometer contact which takes the place of the indicator needle of the Machmeter) are differentiated to provide an elevator feedback control voltage proportional to the rate of change of forward speed which furnishes a very effective means for damping long period longitudinal (phugoid) oscillations of the craft. Airspeed feedback to the elevator has also been programmed to minimize the so-called "tuckunder" (nose down) tendencies typical of high speed aircraft flying at Mach numbers above .75. A pressure operated automatic gain control which functions as an airspeed compensator is inserted in the amplifier section of both the normal accelerometer and the rate of Mach signal channels. This system of automatic longitudinal stability augmentation is designed for aircraft equipped with fully powered longitudinal surface controls wherein a so-called series linkage is used in the elevator control cable system which permits unimpeded manual actuation of the control stick while the automatic system is in operation, the latter being limited to but a small amount of elevator deflection, thus leaving authority over the elevator controls to the pilot at all times. Instead of the standard combination of servo power amplifier, servo motor, hydraulic valve and power cylinder which constitute the principal component elements of a fully powered elevator surface control system, a hydraulic linear servo actuator comprising a so-called Moog valve is preferably used in place of the conventional servo motor for actuating the hydraulically powered surface controls.

Further objects and advantages of the present invention will become more apparent from the ensuing detailed description of a preferred embodiment thereof and from the appended drawings in which.

Figure 6:
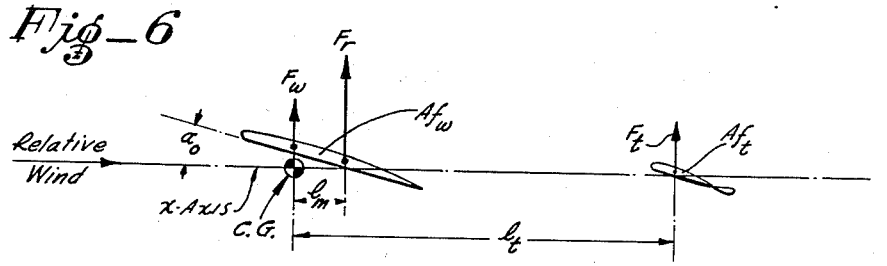
Figure 6:
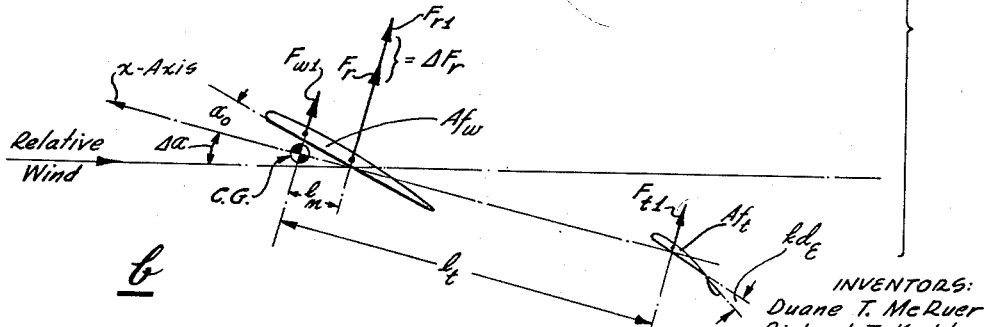

Figure 6 ($a$ and $b$) are simplified sketches showing wing- and horizontal tail-airfoils of a hypothetical aircraft in their longitudinal positional relationship to the center of gravity of the complete craft and to the flight path of the craft ($16a$=equilibrium flight, $16b$=disturbed flight), these diagrams serving to demonstrate the augmentation of stability derivative $U_w$ through $a_z$ elevator feedback.

Figure 1:
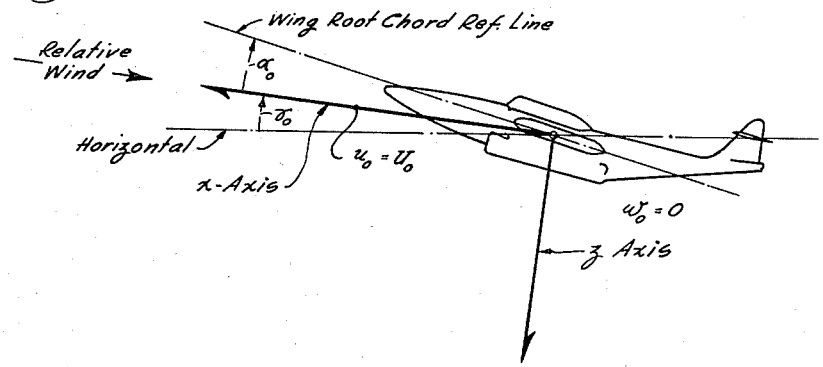
Figure 1 is a schematic profile view of an aircraft in flight taken in the vertical plane of symmetry of the craft and presenting a longitudinal notation of the $x$ and $z$ stability axes of the craft in the equilibrium condition, including graphic definitions of symbols used for identifying displacement angles, velocity components, etc.
Figure 2:
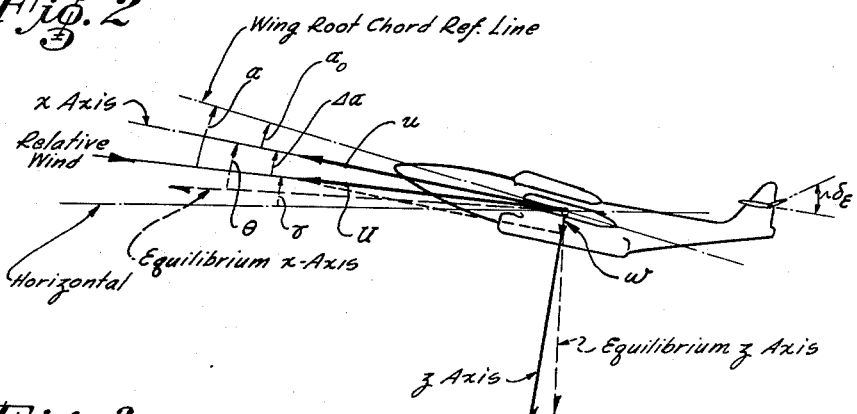
Figure 2 is the same profile view of an aircraft as that submitted in Figure 1 except that the stability axes of the craft are here shown in a disturbed condition of flight.

Referring first to the schematic profile views (in a vertical plane) of an aircraft in flight given in Figures 1 and 2, the stability axes $x$ and $z$ of this craft are here shown in a vertical equilibrium condition (Figure 1) and in a vertically disturbed condition (Figure 2), respectively. The equilibrium position of these axes in Figure 2 is marked by the respective dashed lines $x$ and $z$. These drawings serve the sole purpose of graphically defining part of the symbols used in the subsequent specification and enumerated below. The given definitions follow essentially the annotations of the generally accepted nomenclature for aeronautics endorsed by the N.A.C.A. (=National Advisory Committee for Aeronautics, United States) except that the elevator deflections upward are herein considered positive:

$x$-axis=longitudinal aircraft stability axis, parallel to relative wind when aircraft is in equilibrium condition $y$-axis=lateral aircraft stability axis, perpendicular to $x$-axis and horizontal when craft is in equilibrium position $z$-axis=vertical aircraft stability axis, normal to $x$ and $y$-axes $a_z$=vertical acceleration along $z$-axis $M$=moment about $y$-axis=pitching moment $p$=angular velocity in roll about $x$-axis $q$=angular velocity in pitch about $y$-axis $Q_c$=pressure differential from Pitot-static lines $r$=angular velocity in yaw about $z$-axis $u$=total disturbed forward velocity along $x$-axis $U$=total disturbed forward velocity along flight path $v$=lateral velocity along $y$-axis $w$=total disturbed vertical velocity along $z$-axis $Z$=force acting on airframe along $z$-axis $\alpha$=total disturbed angle of attack: the angle between the relative wind and the wing chord reference line $\gamma$=total disturbed flight path angle: the angle between the direction of motion of the airplane and the horizontal $\delta_E$=elevator deflection angle, measured positive upward from elevator position required for the equilibrium flight condition $M_{\delta_E}\delta_E$ (or $M_{\delta_E}$)=component of pitching moment due to $\delta_E$ $Z_{\delta_E}\delta_E$ (or $Z_{\delta_E}$)=component of Z due to $\delta_E$ $Mq$, $Mu$, $Mw$, $M\dot{w}$, $Zw$, $Z\dot{w}$ etc. are similarly defined as components of M due to $q$, $u$, $w$, $\dot{w}$ or as components of Z due to $w$, $\dot{w}$ etc., respectively $\theta = {_0}\!\int^t q\,dt$ =angle of pitch: the angle between the equilibrium $x$-axis and the disturbed $x$-axis $\phi = {_0}\!\int^t p\,dt$ =bank angle: angle between equilibrium $y$-axis and disturbed $y$-axis (measured in the $y$—$z$ plane)

$\alpha_0$, $\theta_0$, $\gamma_0$, $u_0$, $U_0$, $w_0$ etc.=values of the variables when the airplane is in equilibrium condition before the disturbance $\Delta\alpha$, $\Delta\theta$, $\Delta\gamma$, $\Delta u$, $\Delta U$, $\Delta w$ etc.=perturbation values during the airplane disturbance $\omega_{sp}$=short period natural frequency $\zeta_{sp}$=short period damping ratio

*Equalization.*—"Equalization" is here defined as the process of modifying the performance of any of the system elements and of the overall system by external means in order to achieve satisfactory system operation. Equalization elements are considered alterable within the realm of physical realizability and practicality.

The problem of stability augmentation, like any problem of aircraft flight control, resolves itself into a problem of servo mechanism design which is concerned with the synthesis of a mechanism capable of controlling the motion of the airframe.

The ability to control the motions of any element of a system requires the presence of output quantities in that element which can be controlled, and of input quantities capable of applying the control. In the more specific case of aircraft control, this means that airframe forces and motions can be controlled by mechanisms which are capable of changing the forces or moments on the airframe by changing the airflow pattern about that airframe.

The logical approach to any control design problem must stem from a consideration of the unalterable element(s) in the system. The physical quantities to be controlled must be identified, and the means of imposing control upon the unalterable element(s) must be established. The ability to physically measure the controlled variables and to physically actuate the mechanisms which apply forces and moments must then be carefully considered.

In the initial stages of design of an aircraft control system, the airframe may be considered an alterable element. Certain airframe parameters may be influenced by control system objectives. However, many design parameters affecting the airframe performance are fixed by considerations other than control, such as landing speed and weight. For these and other reasons, the final airframe exterior configurations must be completely established prior to those of other components of the overall control system. The airframe is therefore necessarily regarded as an unalterable element in the very early stages of design.

The motions of the airframe as an unalterable dynamic element are conveniently described by various sets of differential equations corresponding to the degree of freedom under consideration. These equations are derived under a given set of assumptions which help to make them more readily adaptable for the solution of the dynamics problems at hand. One of these assumptions establishes the condition that during equilibrium flight, the wings are level and all components of velocity are zero except $u_0$ (i.e., $v_0=p_0=q_0=r_0=\phi_0=0$). This assumption eliminates cross-coupling derivatives so that the equations may be written in two independent groups: one for the longitudinal motions and one for the lateral motions of the airframe. Investigation of the dynamic responses of the airframe to gusts and control deflections is also greatly simplified by first considering the airframe restrained to various one and two degrees of freedom motions.

The equations of motion of the airframe show clearly the basic physical airframe output quantities capable of being utilized for control as well as the possible actuating means to be used in applying some function of the output quantity to the airframe. However, before any selection of controlled variables can be made, it is necessary to consider very carefully the detailed dynamics of the airframe unalterable element which involves an analytic study of the airframe's longitudinal and lateral motions and of the important airplane stability derivatives (inherent or created) affecting these motions. In these studies, the airframe is considered as a series of transfer functions from which both transient and frequency response plots are developed which ultimately lead to important conclusions as to the choice of the output variables best suited for controlling the various airframe motions.

The longitudinal transfer functions can be obtained directly from the above mentioned longitudinal group of basic equations of motion and are usually given for elevator deflections $$\left(\text{such as } \frac{u}{\delta_E}, \frac{\alpha}{\delta_E}, \frac{\theta}{\delta_E} \text{ etc.}\right)$$

The denominator in the right hand portions of these longitudinal transfer functions gives the form of the characteristic oscillatory modes in the longitudinal motions of the airframe—the motions which must ultimately be properly changed by effective augmentation. These oscillatory modes are typical for conventional aircraft: one of a short period with usually heavy damping and a second mode of a long period with poor damping. The first of these oscillations is called the longitudinal short period mode, and the second is referred to as the phugoid, or long period mode. The characteristic denominator of the longitudinal transfer functions is a fourth order expression which may be approximately factored into the familiar short period and phugoid quadratics. Intensive investigation of the terms comprising the coefficients in these quadratics and careful examination of the frequency response plots of the transfer functions themselves provide valuable insight as to the effects upon the short period and phugoid oscillations available through adjustment of each airframe output variable.

It must be borne in mind that transfer functions written for elevator deflections present a case of single degree of freedom control only. In cases where there is complex coupling or a multiplicity of control elements, the straight forward solutions to control problems are not to evident from individual (one degree of freedom) frequency response curves alone. Therefore a considerable amount of reliance for preliminary control design work is placed upon an understanding of the effects of varying stability derivatives upon the airframe motions (i.e., an understanding of the method of employing equivalent stability derivatives). It has already been pointed out in the introductory text of this specification, that if a control motion is made a direct (no lag) function of an airframe output motion, the controller may be thought of as an airframe stability derivative augmenting device. (For example, assume the controller has the transfer function $$\frac{\delta_E}{u} = Ku$$

where K is a constant. Then $\delta_E = Kuu$;

$$M_{\delta_E}\delta_E = (M_{\delta_E}Ku)u$$

so that $M_{\delta_E}Ku$ is an augmented $Mu$.) Using this concept, and studying the longitudinal characteristic equation as the single stability derivative is varied, leads to many helpful conclusions regarding the effects of various types of controllers upon the airframe.

After this broad outline of the methods of analysis underlying the design of the present longitudinal stability augmentation system, a brief summary of conclusions will be given which is based on these analytical studies as well as on an evaluation of other factors which must be taken into overall account, all of which has led to the particular selection of airframe output quantities actually used in the present system of elevator feedback control. In order to simplify the presentation, a detailed account of the various impulse gust and frequence response plots which have pointed the way towards this selection will not be submitted. These plots readily serve to substantiate many of the reasons for the conclusions enumerated below:

As a first basic and general conclusion, it can be stated that in dealing with the longitudinal motion of an airframe under most acceptable flight conditions, two modes can be considered more or less independently. The long period or phugoid mode which is essentially a poorly damped oscillation in airspeed, altitude and pitch angle, and the short period mode which is a highly damped subsidence in pitch angle, angle of attack and normal acceleration. The only controlled output variables capable of being used with minimum equalization to control both the phugoid and the short period, are pitch angle (or rate) and vertical acceleration. An angle of attack controller is most useful for controlling the short period, and an airspeed controller or forward speed controller is most useful for stabilizing the phugoid.

Taken one by one, the individual airframe output quantities available for control present the following picture:

*Pitch angle.*—Large pitch angle changes occur during the phugoid and fairly large changes during the short period. A pitch controller would be very adequate in controlling the phugoid and the short period motions, requiring fairly high gain for the latter. Pitch angle is easily equalized in the short period mode. However, being an inertial space reference, it is unsuitable for stability augmentation and stabilization to external references such as a fire control system. Pitch angle stabilization would also result in good phugoid stabilization with little or no additional equalization. If gyros were used as reference for longitudinal stability augmentation, there would exist the possibility of erection system phugoid coupling. (The erection mechanism of a vertical gyro maintains the gyro rotor parallel to the gravity vector by sensing the vertical and applying corrective torque to the gyro gimbals. The rate of change or rotor-gimbal-angle due to this torque is generally quite slow and is roughly of the order of magnitude of the pitch rate of the airplane when in phugoid motion. When the airplane is experiencing phugoid motion, friction between the elements attached to the pitch pot wiper and those attached to the pitch pot (in a system where this type of pick-off device is used) is likely to cause the rotor to be displaced from the true vertical and thus result in operation of the erection mechanism. This coupling between airplane and erection mechanism motions can result in low frequency large amplitude oscillations.) Furthermore, gyros prove to be unsuitable because they are not readily adaptable to problems of stabilization to external references since the gyro establishes one spacial axis, and the external reference, e.g., the radar tracking line) establishes another. As a result, special devices would be needed to make the two compatible.

*Angle of attack.*—Large angle of attack changes take place during the short period, but the phugoid motion has very small angle of attack variations associated with it. While it is seen that angle of attack can be easily equalized in the short period mode, is well suited to stability augmentation, easily stabilized to external references, and desirable from the point of view of high lift coefficient, it is not usable as a reference for the phugoid because of its inability to appreciably affect the latter. Furthermore, approved angle of attack sensors are not available in the market at the present time. (See text following immediately after next paragraph.)

*Normal acceleration.*—Large vertical accelerations of comparable magnitude exist at both phugoid and short period frequencies. In the short period, normal acceleration is dynamically equivalent to angle of attack. (See following paragraph.) Consequently, it is easily equalized and represents an excellent stability augmenter reference for the short period mode. Further, an air-frame stabilized to normal acceleration always tends to fly at unity load factor unless commanded differently as in a turn or by external reference. Like angle of attack, it is a desirable type of control for high lift coefficient flight, particularly in high altitude interceptions. Normal acceleration is intimately related to flight path angle in a desirable way $$\left(a_z = u_0 \frac{d\gamma}{dt}\right)$$

and serves as an excellent feedback for a command signal. In the phugoid motion, pitch rate and normal acceleration are essentially equivalent. A realizable threshold in a normal accelerometer system—as well as in a pitch rate gyro system—will result in little or no phugoid stabilization (due to appreciable altitude deadband caused by the system threshold).

*Normal acceleration feedback in the short period mode resulting in augmentation of same airframe stability derivatives as angle of attack feedback.*—The following considerations serve to point out in somewhat greater detail the important relationship between angle of attack feedback and normal acceleration feedback with regard to the effect of these feedbacks upon the stability derivatives $M_w$, $M_{\dot{w}}$, $Z_w$ and $Z_{\dot{w}}$. (These considerations are here presented in a simplified manner and can be substantiated by more elaborate proofs.):

In the short period motion, the approximate equations of motion are (assuming $u = u_0$)

$$\dot{w} - u_0 q = Z_{\dot{w}}\dot{w} + Z_w w + Z_{\delta_E}\delta_E = a_z$$
$$\dot{q} = M_q q + M_w w + M_{\dot{w}}\dot{w} + M_{\delta_E}\delta_E$$

If an angle of attack controller were used, elevator deflection due to $\Delta\alpha$ or $$\delta_{E\Delta\alpha} = Kw + k\dot{w} \quad (\text{since } w = u_0\Delta\alpha)$$

where $K$ and $k$ are constants.

Using the concept of stability augmentation:

$$\dot{w} - u_0 q = Z_w w + Z_{\dot{w}}\dot{w} + Z_{\delta_E}(Kw + k\dot{w}) + Z_{\delta_E}\delta_E$$
$$\dot{q} = M_q q + M_w w + M_{\dot{w}}\dot{w} + M_{\delta_E}(Kw + k\dot{w}) + M_{\delta_E}\delta_E$$

or, $$\dot{w} - u_0 q = (Z_w + KZ_{\delta_E})w + (Z_{\dot{w}} + kZ_{\delta_E})\dot{w} + Z_{\delta_E}\delta_E$$
$$\dot{q} = M_q q + (M_w + KM_{\delta_E})w + (M_{\dot{w}} + kM_{\delta_E})\dot{w} + M_{\delta_E}\delta_E$$

Thus, angle of attack feedback results in augmentation of $Z_w$, $Z_{\dot{w}}$, $M_w$ and $M_{\dot{w}}$.

Since $$\omega_{sp} \approx \sqrt{\frac{Z_w M_q - u_0 M_w}{1 - Z_{\dot{w}}}}$$

$$\zeta_{sp} \approx \frac{1}{2\omega_{sp}} \frac{(-u_0 M_{\dot{w}} - M_q - Z_w)}{(1 - Z_{\dot{w}})}$$

the effect of $Z_{\dot{w}}$, (even when augmented), is generally negligible. Thus, $\omega_{sp}$ is changed primarily due to augmentation of $Z_w$ and $M_w$, and $\delta_{sp}$ is changed primarily due to augmentation of $M_{\dot{w}}$ and $Z_{\dot{w}}$.

The acceleration at the C.G. is $$a_z = \dot{w} - u_0 q = Z_w w + Z_{\dot{w}} \dot{w} + Z_{\delta_E} \delta_E$$

Figure 4:
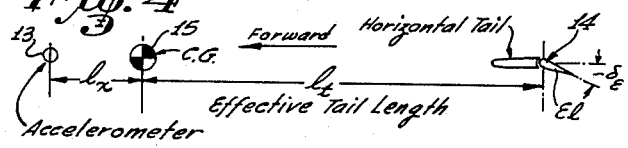
Figure 4 is a sketch showing the positional relationship (in a vertical plane) of the center of percussion, the center of gravity and the effective center of rotation in an airframe controlled by an elevator (the airframe being considered a single rigid mass).

As will be explained later (see text referring to normal accelerometer and to Figure 4), the acceleration $a_z'$ measured at a point forward of the C.G. of the craft which constitutes the center of rotation of the airframe for elevator inputs:

$$a_z' \approx a_z - Z_{\delta_E} \delta_E = Z_w w + Z_{\dot{w}} \dot{w}$$

Since the effect of $Z_{\dot{w}}$ is generally negligible, normal acceleration measured at the center of rotation is dynamically equivalent to an angle of attack measurement, i.e.

$$a_z' \approx Z_w w = (Z_w u_0) \Delta\alpha \quad (w = u_0 \Delta\alpha)$$

Normal acceleration feedback to the elevator is therefore also equivalent to angle of attack feedback or $$\delta_{Ea_z}' = \delta_{E\Delta\alpha} = K_w + k_{\dot{w}}$$

Both methods result in augmentation of the same airframe stability derivatives.

Augmentation of the derivative $M_w$ due to $a_z$ elevator feedback (viz. due to $ka_z'$) can be readily demonstrated with the help of sketches Figure 6a and Figure 6b in which the wing airfoil $Af_w$ and the horizontal tail airfoil $Af_t$ of a hypothetical craft in flight are schematically represented in their assumed positional relationship to the C.G. of the complete craft, sketch 6a showing the craft in equilibrium flight and sketch 6b showing the same craft in a disturbed position. In both sketches, $l_t$=effective tail length. $F_r$ in Figure 6a represents the resultant of wing lift force $F_w$ and tail lift force $F_t$ with $l_m$ representing the moment arm of $F_r$ about the C.G. of the craft. In Figure 6b, $F_{r1} = F_{w1} + F_{t1}$, and $F_{r1} - F_r = \Delta F_r$ due to $\Delta\alpha$. Furthermore, in Figure 6b, a rudder deflection $k_{\delta_E}$ due to a $a_z'$ resulting from $\Delta\alpha$ is introduced so that therefore:

$$M_w \approx \Delta F_r l_m + l_t k_{\delta_E}$$

where $l_t k_{\delta_E}$ represents the augmented portion of $M_w$.

From the beforesaid, it can also be seen that the primary difference between the present feedback system and other systems (which use generally a pitch rate gyro) is that the former system augments $M_w$ and $M_{\dot{w}}$, whereas other systems augment $M_q$ for pitch rate feedback, or $M_\theta$ (which is non-existent in the airframe alone but is somewhat similar in its effects to $M_w$) when pitch angle is used.

Since for short period or fast maneuvering motion, $$a_z = \frac{d\gamma}{dt} = (\dot{w} - u_0 \theta) \approx Z_w w$$

it is seen that lift ($Z_w w$) is directly related to rate of change of flight path angle $\gamma$ and can be measured by a normal accelerometer. In maneuvering flight (both manual and automatic control), flight path angle is the primary variable that must be controlled. Hence, normal acceleration is the most desirable feedback.

*Forward acceleration.*—Large forward accelerations exist at the phugoid frequency, whereas these airspeed changes are relatively small during the short period. Control of the short period natural frequency with an airspeed controller would require extremely high gain; however, a decided increase in phugoid damping results from rate of change of airspeed stabilization with little effect on other characteristics, requiring little or no additional equalization. Airspeed feedback can be programmed to minimize the so-called "tuck-under" (nose down) tendencies typical of high speed aircraft through Mach numbers at which these "tuck-under" tendencies exist.

In addition, moderate values of airspeed feedback applied at all but the critical Mach number range (where higher gains are required) provide so-called stick-free stability. (See further details below.)

Figure 3:
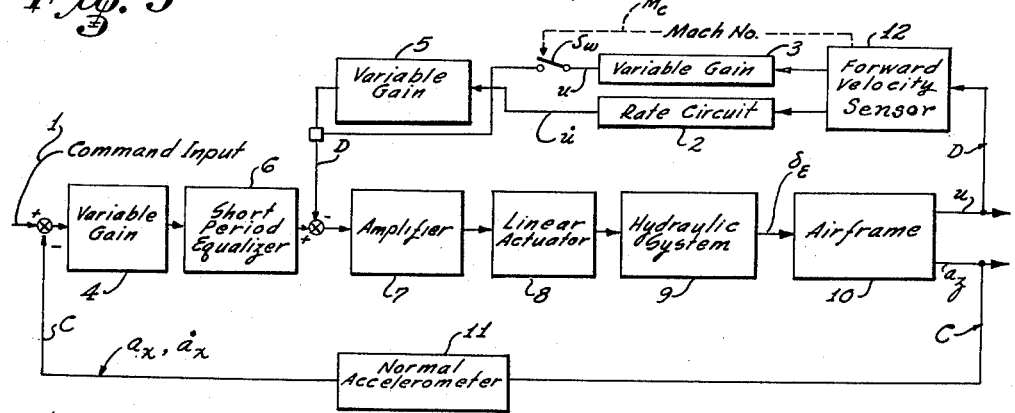
Figure 3 shows a simplified functional block diagram of the longitudinal stability augmentation system of the present invention.

A careful evaluation of the various factors summarized above points the way to the design of the actual system of longitudinal stability augmentation which constitutes the subject matter of the present invention and which is represented in the simplified symbolical functional block diagram of Figure 3. As previously stated, the basic airframe output quantities selected to best satisfy the requirements are $u$, $\dot{u}$, $a_z$ and $\dot{a}_z$ feedbacks to the elevator. In the diagram of Figure 3, the command input at 1 represents illustratively either a manual or an automatic control mode (the latter including, for instance, glide-slope receiver control during landing approaches, or altitude control), in conjunction with which the stabilization system (see loops C and D emanating from the output quantities "$a_z$" and "$u$", respectively, of airframe 10) may become operative. The normal acceleration loop C is primarily for the purpose of short period equalization (see boxes 11 and 6). In general, the short period natural frequency varies considerably with respect to flight conditions, primarily because of the change in static margin. (For small pitching oscillations, the airframe is analogous to a simple spring-mass-damper system. The spring is a function of the relative longitudinal displacement of the C.G. and the center of aerodynamic forces, this placement being defined as the static margin.) The acceleration feedback $a_z$ essentially minimizes this change in short period natural frequency. In the broader sense, the $a_z$ feedback tends to maintain flight at constant load factor. (Load factor=ratio of lift force to normal component of gravity force. In the absence of a command signal, the error voltage fed to the elevator is the electrical output of the accelerometer, this being proportional to the difference in load factor from unity. The elevator thus causes the airplane to move in a way so as to reduce the error voltage and hence, keep the load factor constant.)

In the supersonic Mach range, the short period damping ratio of most airframes is relatively low. The rate of change of normal acceleration ($\dot{a}_z$) feedback provides the additional damping. Essentially, the system anticipates the acceleration and acts accordingly to reduce the resultant acceleration during the transient motion. (Further effects of the $a_z$ and $\dot{a}_z$ feedbacks will be outlined after a description of some of the "mechanized" features of the airframe surface control system has been given.)

The rate of change of forward speed feedback loop D in Figure 3 is primarily for phugoid stabilization. As stated before, the phugoid mode of the airframe alone is generally a lightly damped long period oscillation. Rate of change of forward velocity ($\dot{u}$) feedback to the elevator provides an extremely powerful means of obtaining phugoid damping. For some combinations of airframe configurations and flight conditions, the phugoid mode becomes unstable and splits up into two real roots, one of which is negative. This phenomenon is a form of "tuck-under." "Tuck-under" is primarily caused by a rearward shift of the aerodynamic center with increasing Mach number and is characterized by a nose down tendency and a divergence in forward speed. The "tuck-under" tendency can be eliminated by providing a suitable amount of up-elevator deflection whenever the craft flies within the critical range of speeds where such "tuck-under" tendency exists. This form of control thereby contributes to stick-free stability throughout this critical Mach number range. (An airplane is here understood to have stick-free stability when, if acted upon by temporary disturbances such as gusts, it returns to its original attitude and speed, there being no additional inputs by the pilot either through the stick or throttle.)

In the present system, the above mentioned up-elevator deflections are automatically secured through $u$-feedback signals in addition to the $\dot{u}$-feedback signals of rate circuit 2. Box 3 in series with switch Sw in the output from forward velocity sensor 12 in Figure 3 symbolically indicates that for all speeds within the critical Mach number range where "tuck-under" tendencies exist (this critical region may, for instance, be confined to a range between Mach numbers .78 and .86), switch Sw makes contact thereby providing a variable $u$-feedback of moderate value which is proportional to forward speed within that range. This $u$-feedback must be so phased as to result in an up-elevator deflection angle that increases from zero at the lower limit of the critical range to some such value as three degrees at the upper limit of this critical range. (Further details regarding this form of "tuck-under" control, and the actual preferred layout of feedback channels C and D are described in connection with Figure 5.)

The required amounts of feedback in both loops C and D vary in general with Mach number and altitude. Thus, provisions are made for automatically changing the gains in both feedback channels as symbolically indicated by boxes 4 and 5 in Figure 3. (Automatic control means not shown. These boxes also include gain control means independent of the airspeed compensating means. These latter means are by-passed by the above discussed $u$-feedback voltages.) The actual method of airspeed-altitude compensation used in this system will be more fully described in connection with Figure 5. Likewise, the elevator actuating system, summarily represented in Figure 3 by the sequence of boxes 7, 8 and 9, entitled "Amplifier," "Linear Actuator" and "Hydraulic System," respectively, whose output $\delta_E$ controls airframe 10.

The sensors used to provide the control signals in the feedback loops C and D are schematically represented in Figure 3 by boxes 11 and 12 entitled "Normal Accelerometer" and "Forward Velocity Sensor," respectively.

It is helpful at this point to gain a more practical insight into the working principles of the feedback system of Figure 3 by attempting to envision the actual physical events which take place when a craft is disturbed from a condition of equilibrium in its longitudinal motion and the stability augmentation system of the present invention enters into action.

The augmenting effect of $\dot{a}_z$ elevator feedback on the longitudinal stability of the aircraft, i.e. the practical elimination of longitudinal short period oscillations of the craft by means of automatic $a_z$ and $\dot{a}_z$ elevator feedback control, can best be physically visualized through a slow motion or step-by-step observation of a short period longitudinal oscillation of the craft which originates from a typical outside disturbance. Assume that a vertical downward gust strikes the aircraft in flight. The immediate effect is an abrupt, decrease of the effective angle of attack without change in $\theta$ which initiates a rapid downward motion of the craft. However, since the downward gust acts simultaneously on the entire craft including the horizontal tail, the downward force acting on the latter results in a positive pitching moment (nose up) which, combined with the initiated downward motion of the craft, causes a rapid increase of the angle of attack. Yet, as the downward motion of the craft gains momentum, the resulting upward force on the horizontal tail reverses the pitching moment (nose down), causing the angle of attack again to decrease. A certain time delay (and "overshoot") is involved in the build-up of the counteracting or "restoring" forces. Thus, the reversal in pitch (nose down) and the forces of gravity will combine in increasing the craft's forward speed and, after a time, will cause the craft to regain lost altitude. Increase in forward speed (after an initial loss) and nose down momentum, in turn, will be followed by a renewed pitch reversal (nose up) which is mainly due to the downward forces now acting on the horizontal tail. The "restoring" forces are, however, of considerably smaller amplitude, and within approximately 3 seconds, the reversals or oscillations in pitch and angle of attack and their effects on altitude and forward speed are reduced to insignificance so that equilibrium is thereafter again established.

From this approximate analysis of a short period oscillation it can be deduced that, since the phenomenon of sudden downward vertical displacement (which is physically felt as a "bump" when flying through turbulent air) precedes all oscillatory motion, a sensor of the rate of change of vertical acceleration ($\dot{a}_z$) aboard the craft will generate a strong positive $\dot{a}_z$ signal at an instant of time in which the vertical displacement of the craft has not yet gained momentum. If in the present longitudinal stability augmentation system the control signals from a vertical accelerometer are so phased that a positive $\dot{a}_z$ signal resulting from an upward acceleration of the "active" mass of the aforementioned accelerometer will cause the elevators to be deflected upward, this strong positive $\dot{a}_z$ signal will therefore establish an up-elevator deflection in virtual anticipation of the nose-down pitch moment due to the horizontal tail which has been mentioned in the preceding paragraph. The initial up-elevator deflection will thus effectively damp out the normally ensuing first pitching reversal (nose down) which strongly accentuates the oscillatory motion of the craft. As the downward acceleration of the craft is stopped and reversed, elevator deflection in the opposite direction (due to downward acceleration of the "active" mass referred to above) again opposes the "adverse" pitching moment due to the horizontal tail, thus preventing an "overshoot" in upward acceleration of the craft. In short: the $\dot{a}_z$ feedback acts as an effective dynamic damping medium which aids the airframe's inherent tendency to re-establish flight equilibrium. Static longitudinal stability is maintained by the long-time constant $a_z$ displacement signals from the vertical sensor.

The stability augmenting effect in the short period mode can be similarly demonstrated for cases in which the "disturbance" is manually introduced by an elevator deflection executed by the pilot.

The damping effect on the phugoid motion (which motion may build up from any slight deviation from equilibrium flight) can be physically illustrated in the following manner:

In the phugoid oscillation, forward acceleration and pitch angle are exactly opposite in phase, such that when pitch angle is a maximum negative value, $\dot{u}$ is a maximum positive value. The $\dot{u}$ signal is fed to the elevators such that a positive forward acceleration commands a positive or up-elevator. Therefore, when $\dot{u}$ is a maximum, and hence $\theta$ is a minimum, the elevator is at a maximum up deflection causing the airplane to pitch up at a rate which essentially prevents $\dot{u}$ to "overshoot" to any appreciable negative value (thus also preventing $\theta$ from building up to an appreciable positive value) and which is tantamount to a rapid return of the craft to an equilibrium flight attitude.

From the above-said, it becomes self-evident that elevator deflections resulting from accelerometer signals or from Machmeter signals must be so phased that:

Up-elevator deflections (positive) issue from accelerometer signals in response to upward accelerations of the aforementioned accelerometer's "active" mass (downward accelerations of craft), and vice-versa; and Up-elevator deflections (positive) issue from Machmeter signals responsive of an increase in airspeed, and vice-versa.

For a more complete physical description of a preferred embodiment of the present longitudinal stability augmentation system whose design aspects have just been outlined in a generalized simplified fashion, it is appropriate to first briefly analyze the sensors which have been selected to measure the airframe output quantities referred to in Figure 3. These sensors are a Normal Accelerometer and a Machmeter.

*Normal Accelerometer.*—The vertical acceleration of the airframe measured by an accelerometer at the C.G. of the airframe can be considered to be proportional to the sum of a function of forward velocity of the airplane along the x-axis, a function of its vertical velocity along the z-axis and a function of elevator deflection angle. In equation form, this may be written as follows:

$$a_z = Z_u u + Z_w w + Z_{\delta_E} \delta_E$$

If $Z_u u$ is small (as in the short period motion), and a signal proportional to $Z_{\delta_E} \delta_E$ is subtracted from the accelerometer signal, the new accelerometer signal $(a_z^1)$ $$a_z^1 = a_z - Z_{\delta_E} \delta_E \approx Z_w w = (Z_w u_0) \Delta \alpha \text{ (short period)}$$

If $Z_w w$ is small (as in the phugoid) and the $Z_{\delta_E} \delta_E$ signal is subtracted, $$a_z^1 = a_z - Z_{\delta_E} \delta_E \approx Z_u u \text{ (phugoid)}$$

An effective means of removing the $Z_{\delta_E}\delta_E$-portions from the accelerometer signal has been made available by moving the accelerometer to a point forward of the C.G. of the airframe where the net acceleration along the z-axis due to elevator deflection is zero. This so-called center of percussion relationship of the airframe as a rigid mass can be recognized by examining the sketch in Figure 4 in which the positional relationship between the C.G. 15 of the airframe mass, the center of percussion 14 and the effective center of mass rotation 13 is schematically portrayed in a normally vertical plane through the longitudinal axis of the airframe, and in which it is seen that if elevator E1 is deflected (14=point of application of impulse to rigid body =center of percussion), the airframe rotates without translation about some point 13 forward of the C.G. (13=effective instantaneous center of rotation of rigid body which is subject to two equal and opposite accelerations: one due to the translational acceleration of the C.G. in one direction and the other due to rotation of 13 about the C.G. in the opposite direction. The effective tail length $l_t$ determines the distance $l_x$ of center 13 from the C.G.). Thus, if the normal accelerometer is located at point 13, essentially only those components of normal force which are due to vertical gusts and due to short period and phugoid oscillations of the craft, will produce a signal at the accelerometer output. This may be expressed mathematically by the equation $$l_x \dot{q} + Z_{\delta_E} \delta_E = 0$$

where $l_x \dot{q}$ is the acceleration of the center 13 about the C.G. so that the accelerometer reads $$a_z^1 \equiv a_z + l_x \dot{q} = Z_u u + Z_w w + (Z_{\delta_E} \delta_E + l_x \dot{q})$$

where $a_z^1$=accelerometer reading at effective center of rotation of craft. If the condition is assumed that $\dot{q}$ is due to elevator alone, $$a_z^1 = Z_u u \text{ or } = Z_w w \text{ (short period)}$$

For optimum system operation, the normal accelerometer must be designed for the same range of operation for which the aircraft is designed which carries this accelerometer. Permissible deviations from a mean flight path due to threshold effects during automatic operation set the limits on the sensor threshold. Airframe dynamic characteristics and system stability impose the limits on the natural frequency and damping ratio.

A mass and spring type normal accelerometer which shows the following characteristics has been selected as a normal sensor for the present automatic longitudinal stability augmentation system:

Range of operation _____ +6g to −3g.
Threshold _____ ±.001g.
Linearity _____ ±5%.
Gain constant _____ 1 v/g.
Dynamics _____ .8 critically damped (natural frequency=52 c.p.s.).

*Machmeter.*—A Machmeter indicates the existing Mach number during flight. The ratio of true airspeed and speed of sound which is known as the Mach number, is determined (through special calibration of the Machmeter) from the measurement of the two variables $\Delta P$=differential pressure corresponding to a given indicated airspeed, and $P$=pressure corresponding to a given altitude. (Use of a Mach number indicator simplifies the gain compensation since the desired altitude compensation is inherently a part of the sensor.) In order to use a Machmeter as an airspeed sensor in the system of automatic longitudinal stability augmentation herein described, the pointer of the Machmeter is simply replaced by a suitable potentiometer arm.

Proceeding now to a general description of the physical characteristics of an airframe surface control system capable of achieving the functional objectives of the present invention, it is manifest that such a surface control system must be designed for both, satisfactory airframe-pilot operation as well as satisfactory airframe-controller operation. Many elements, such as artificial feel, may be required for a manual control system but are not needed in a system involving automatic operation. Certain other requirements, such as minimum backlash, may be less stringent for manual control than in automatic control. Such elements must of course be designed to be compatible with the requirements for either manual or automatic operation. In a system in which the controller actuator and the surface actuator are separate units as is the case in the fully powered hydraulic surface control system under consideration, special emphasis must be placed on the loads imposed by the latter upon the controller actuator. The surface control system may, in this connection, be considered a quasi or relatively unalterable element. Adverse loading effects on the controller actuator can frequently be altered and minimized by expeditious surface control system design.

Controller actuators may be physically connected into a primary control system in two ways. The first, called a parallel connection, is the conventional installation for automatic pilot servos. The second, called a series connection, is used extensively for stability augmenter applications. In the parallel connection, the actuator and the pilot operate against the same loads, and any movement of the actuator produces a corresponding movement of the pilot's cockpit controls. On the other hand, the series installation is so arranged that the fully powered hydraulic system valve, and hence the surface, is moved without disturbing the pilot's controls. The loads imposed upon a serially connected actuator are therefore much different from those felt in a parallel connection.

An understanding of the factors involving the so-called series installation is of particular importance inasmuch as some form of series installation is required whenever stability augmentation methods are successfully to be employed. It is also of interest to note that stability augmentation modifies the required feel characteristics from those required without augmentation so that the artificial feel system may be considerably simplified.

In the series installation, the actuator is essentially an adjustable extendor within the cable or push rod system. The extendor must operate from an irreversible anchor so that the cockpit control does not move when the valve does; i.e., the actuator load looking toward the valve must be much less than the load looking toward the cockpit controls. To insure that actuator motion is not transmitted to the cockpit controls, the actuator is usually installed as near to the valve as possible, and a special mechanism, such as a detent, is added to the system to act as an irreversible anchor. The load of the series actuator is normally made up of coulomb friction and the inertia of the moving masses between the actuator connection and the valve, almost all the friction load being due to the valve proper. The load seen by an actuator (such as an augmentation servo) installed in series fashion is very non-linear, and very careful design is required to achieve satsifactory practical results. If the actuator is used as part of a stability augmenter destined to remain operative while the manual controls are actuated as in the case of the present application, its authority to move the control surfaces must be limited to a small amount. Within that authority, it is independent of the pilot's controls due to the series installation.

Figure 5:
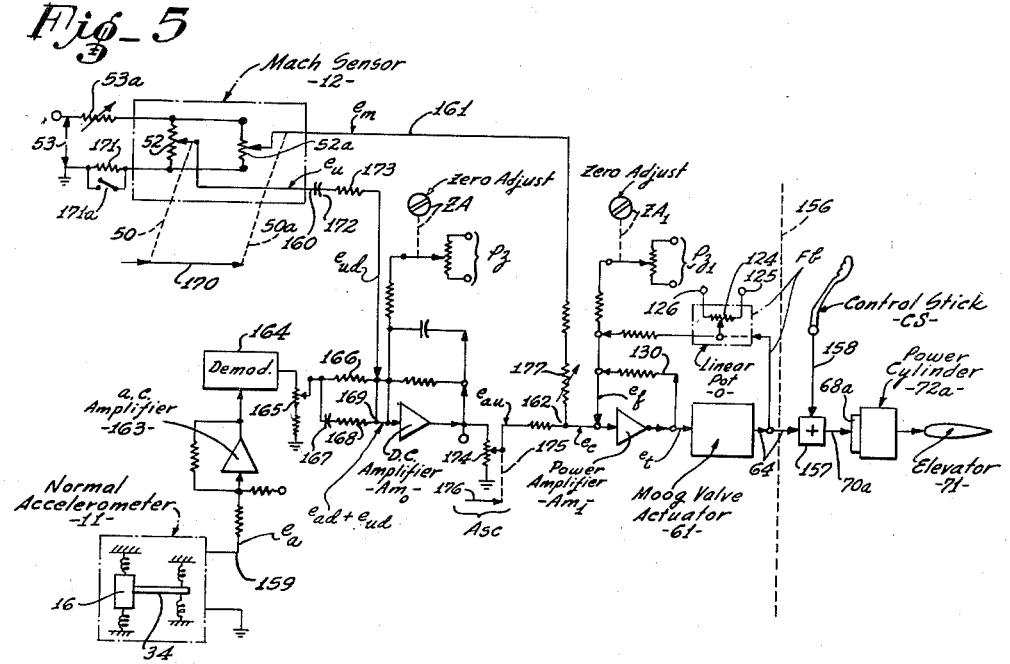
Figure 5 is a simplified overall diagram showing the essential details of mechanization of the longitudinal stability augmenting elevator control system of the present invention.

Proceeding now to the greatly simplified overall diagram of Figure 15 in which essential details of mechanization of the complete longitudinal stability augmenting elevator control system of the present invention are schematically represented, it can be seen that all parts to the right of the dashed vertical line 156 including control stick CS, cable system 70a, servo valve 68a, surface operating power cylinder 72a and elevator control surfaces 71 are illustrative of the manual elevator control system whereas all parts to the left of line 156 portray the automatic portion of the elevator control system which provides longitudinal stability augmentation. Major components located to the left of the line 156 include; a formal accelerometer 11, a Machmeter 12, a transfer type valve actuator 61, an A.C. amplifier 163, a demodulator 164, a power amplifier $Am_1$, a D.C. amplifier $Am_0$, and an airspeed compensator $A_{sc}$. The controlor error-signal $e_t$ feeding into the actuator 61 (this signal being responsible for the amount of displacement of the output shaft 64 of the actuator 61), in turn, equals the algebraic sum of the composite signal $e_c$ from the sensor channels shown in the left portion of the diagram and of the servo followup signal $e_f$ from potentiometer 124. Channel 130 in Figure 5 represents the feedback channel 130 of power amplifier $Am_1$. The followup signal $e_f$, as is well known in the art, reaches a value equal and opposite the control signal $e_c$ as soon as a displacement of output shaft 64 equivalent to the voltage $e_c$ has been completed. The composite control signal $e_c$ is derived via the three separate sensor channels 159, 160 and 161 which converge at point 162, and which receive the signal voltages $e_a$, $e_u$ and $e_m$, respectively, signal $e_a$ originating in the normal accelerometer 11, and signals $e_u$ and $e_m$ originating in the Machmeter 12. Signal $e_a$ from vertical accelerometer 11 (the latter here shown merely as a block containing mass 16 and armature portion 34) passes through A.C. amplifier 163 and is demodulated in the part 164 before being fed through the gain control 165 and through the equalizing circuit composed of resistor 166 in parallel with capacitor 167 and resistor 168. The signal $e_{ad}$ issuing from this equalizing (rate) network is proportional to the algebraic sum of the voltage representing the time rate of change of signal $e_a$ (=voltage across the branch composed of capacitor 167 and resistor 168) and of the voltage representing the magnitude of signal $e_a$ (=voltage across resistor 166). As previously explained, the differentiated voltage (feedback quantity $\dot{a}_z$) serves for dynamic stability augmentation. Signals of extremely low frequency (approximate static condition) pass through resistor 166 only and represent the feedback quantity $a_z$ for static stability augmentation.

At point 169, signal $e_{ad}$ from the vertical accelerometer channel is algebraically added to the signal $e_{ud}$ from Machmeter 12. Machmeter 12 is here simply represented as a block containing potentiometer 52 in parallel with potentiometer 52a, both supplied from D.C. source 53 via adjustable resistor 53a, the position of the respective contact arms 50 and 50a being controlled from the Machmeter mechanism which is here symbolically represented as an input arm 170. Parts 171 and 171a in series with both potentiometers serve as a means of switching the excitation to the Mach sensor "on" or "off." (Part 171a constitutes actually a pair of relay contacts actuated by a pilot-controlled switch. When contacts 171a are open, the large resistor 171 is in series with the Mach sensor pots, and very little voltage is developed across the pots. When contacts 171a are closed, resistor 171 is shunted, and full applied voltage appears across the sensor pots.) If contact arms 50 and 50a are assumed to be controlled in a manner so that with increasing Mach numbers, their contact points or pickoffs on the potentiometers move upward in the drawing, it is seen that the pickoff-voltage $e_u$ in line 160 will increase in proportion to the increase in Mach number; the range of pickoff travel on pot 52 is adjusted to cover the entire range of speeds attainable by the craft under consideration. The pickoff voltage $e_m$ in line 161, however, is seen to remain zero for the lower speed ranges, the total range of pickoff travel here being dimensioned so as to cover a sliding contact section below pot 52a where the pickoff voltage remains zero with advancing pickoff positions or advancing Mach number, and another sliding contact section above pot 52a, where the pickoff voltage remains at a constant preadjusted magnitude with advancing pickup position. The middle range of pickoff travel covered by the resistive portion of the total sliding contact range of pot 52a is adjusted to extend over the previously discussed critical range of Mach numbers where "tuck-under" tendencies exist so that a pickoff voltage increasing from zero level is generated in line 161 as the craft enters the lower limit of this critical range, this pickoff voltage rising to its preadjusted maximum at the upper extreme of pot 52 as the Mach number advances to the upper limit of the critical range, thereby causing the pickoff to reach the upper end of the resistor section of pot 52a. Voltage $e_u$ from potentiometer 52 is differentiated when passing through the rate circuit composed of capacitor 172 and resistor 173 so that voltage $e_{ud}$ which is added to voltage $e_{ad}$ becomes proportional to the rate of change of prevailing forward speed ($\dot{u}$), voltage $e_u$ being proportional to the prevailing forward speed of the craft ($u$ or $U_0$). The combined voltage ($e_{ad}+e_{ud}$) passes through D.C. amplifier $Am_0$ and through an airspeed compensator $A_{sc}$ represented by parts 174, 175 and 176 before being united with the $e_m$ voltage from Machmeter potentiometer 52a. (Parts ZA and Pz serve for calibration purposes.)

Airspeed compensator $A_{sc}$ is an automatic gain control and voltage adjusting device which consists essentially of a differential pressure operated potentiometer (part 174 shown in the drawing) whose attenuation is made inversely proportional to the differential pressure Qc obtained from the airspeed indicator's Pitot line and static line, these latter parts being omitted from the drawing but illustratively represented by input line 176 and control arm 175. The airspeed compensator thus acts to increase the magnitude of the signal voltage $e_{au}$ ($e_{au}$=compensated signal $e_{ad}+e_{ud}$ reaching point 162) when the airspeed decreases, and to decrease this voltage when the airspeed increases, thereby compensating for the decrease in effectiveness of the elevators at low speeds (i.e., providing proportionately larger elevator deflections at low speeds than at high speeds).

Since the $e_m$ signal in line 161 from the Machmeter must be of a pre-adjusted magnitude within the range of speeds where the previously explained "tuck-under" tendency exists, this signal is added to the $e_{au}$ signal after the airspeed compensator. It is so phased as to provide added up-elevator deflection. The relative magnitude of signal $e_m$ with respect to signal $e_{au}$ may be adjusted at 177. (As previously suggested, the exact limits of the critical speed range vary somewhat with the characteristics of the aircraft under consideration, and the maximum $e_u$ pickoff voltage may, for instance, be adjusted in a three degree up-elevator displacement angle.) The algebraic sum of signal $e_m$ and signal $e_{au}$ represents the above cited input voltage $e_c$ of transfer valve 61 before its amplification in power amplifier $Am_1$ and before the algebraic addition of follow-up voltage $e_f$.

What is claimed is:

1. Means of automatically increasing the longitudinal stability of an aircraft in flight, comprising a twin-closed loop servo system controlling the elevators of said craft, one closed loop portion of said servo system providing a composite control signal proportional to vertical acceleration as well as proportional to the rate of change of vertical acceleration of said craft, which signal acts to deflect said elevators so as to effectively eliminate short period longitudinal oscillations, the other closed loop portion of said servo system providing a composite control signal proportional to the forward speed as well as proportional to the rate of change of forward speed of said craft, wherein the latter signal component acts to deflect said elevators so as to effectively eliminate phugoid oscillations of said craft, and both said closed loop portions being non-interfering in their mutual functions the first mentioned servo loop essentially carrying out its functions before the second mentioned loop is entering into play.

2. In a highspeed aircraft having elevator control surfaces means for automatically stabilizing longitudinal short period and phugoid oscillations of said aircraft, comprising: an accelerometer mounted in said aircraft and which is responsive to normal accelerations of said aircraft; a machmeter mounted in said aircraft and which is responsive to the forward speed of said aircraft; means of deriving from said accelerometer first control signals corresponding to the sense, magnitude and rate of change of normal acceleration of said aircraft throughout the flight of said aircraft; means of deriving from said machmeter second control signals corresponding to the magnitude and rate of change of the forward speed of said craft; and means for deflecting said elevator control surfaces in response to said first and second control signals in a sense so as to provide up elevator deflections for downward or forward accelerations of said aircraft and down elevator deflections for upward acceleration or deceleration in forward speed of said aircraft.

3. In an aircraft having elevator control surfaces a longitudinal stability system, comprising: manual means and automatic means adapted to provide manual inputs and automatic inputs, respectively, to effect the actuation of said control surfaces; said automatic means includes a twin-closed loop servo system controlling the elevators of said aircraft, one closed loop portion of said servo system providing a composite control signal proportional to vertical acceleration as well as proportional to the rate of change of vertical acceleration of said aircraft, which signal acts to deflect said elevators so as to effectively eliminate short period longitudinal oscillations, the other closed loop portion of said servo system providing a composite control signal proportional to the forward speed as well as proportional to the rate of change of forward speed of said aircraft, wherein the latter signal component acts to deflect said elevators so as to effectively eliminate phugoid oscillations of said aircraft, and both said closed loop portions being non-interfering in their mutual functions, the first mentioned servo loop essentially carrying out its functions before the second mentioned loop is entering into play, and a series linkage system interconnecting said manual and automatic means and in which the manual inputs are required to move said control surfaces through a larger deflection angle than would otherwise be required if said automatic command means was not in operation.

References Cited in the file of this patent

UNITED STATES PATENTS

| | | |
|---|---|---|
| 1,703,280 | Minorsky | Feb. 26, 1929 |
| 1,988,458 | Minorsky | Jan. 22, 1935 |
| 2,387,795 | Isserstedt | Oct. 30, 1945 |
| 2,595,309 | Slater | May 6, 1952 |
| 2,623,714 | Slater | Dec. 30, 1952 |
| 2,639,875 | Vogel | May 26, 1953 |
| 2,770,429 | Schuck | Nov. 13, 1956 |